Figure 1:
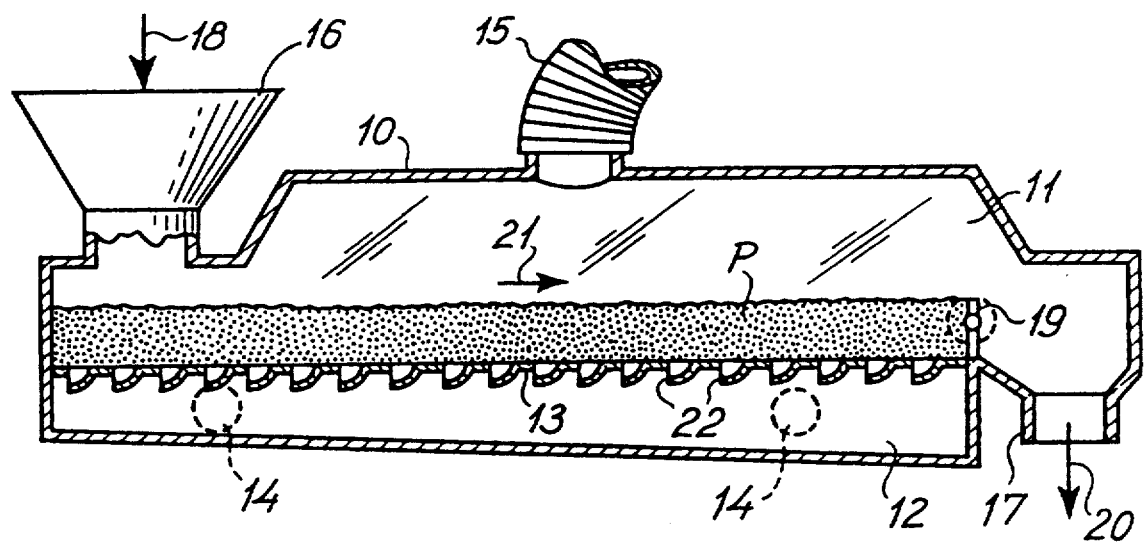

United States Patent [19]

Christensen

[11] Patent Number: 5,357,688
[45] Date of Patent: Oct. 25, 1994

[54] METHOD AND APPARATUS FOR TREATING A PULVERULENT OR PARTICULATE MATERIAL OR PRODUCT WITH GAS

[75] Inventor: Mogens A. Christensen, Virum, Denmark

[73] Assignee: Niro A/S, Soborg, Denmark

[21] Appl. No.: 984,587

[22] PCT Filed: Aug. 21, 1991

[86] PCT No.: PCT/DK91/00240
§ 371 Date: May 4, 1993
§ 102(e) Date: May 4, 1993

[87] PCT Pub. No.: WO92/04113
PCT Pub. Date: Mar. 19, 1992

[30] Foreign Application Priority Data

Sep. 11, 1990 [EP] European Pat. Off. ........ 90610058.1

[51] Int. Cl.$^5$ ............................................. F26B 3/08
[52] U.S. Cl. ............................... 34/369; 34/360; 34/582; 34/588
[58] Field of Search ............ 34/10, 57 R, 57 A, 57 B; 110/245; 432/58; 122/4 D; 422/139, 143; 165/104.16; 431/7, 170

[56] References Cited

U.S. PATENT DOCUMENTS

| | | | |
|---|---|---|---|
| 3,417,975 | 12/1968 | Williams et al. | 261/114 |
| 4,033,555 | 7/1977 | Fong | 259/4 R |
| 4,305,210 | 12/1981 | Christensen et al. | 34/57 B |
| 4,787,152 | 11/1988 | Mark | 34/57 A |
| 4,885,848 | 12/1989 | Christensen | 34/57 A |
| 5,022,164 | 6/1991 | Hansen et al. | 34/57 B |

FOREIGN PATENT DOCUMENTS 149737 9/1983 Denmark.
125516 11/1984 European Pat. Off..

*Primary Examiner*—Denise Gromada
*Attorney, Agent, or Firm*—Dennison, Meserole, Pollack & Scheiner

[57] ABSTRACT

A fluid bed dryer comprises a bed plate (12) defining openings or perforations (22) therein, means (16) for feeding a pulverulent or particulate product (P) to the bed plate (13), means (12, 14) for directing fluidizing gas flows upwardly through said openings or perforations (22) so as to fluidize the product fed thereto, and means (17, 19) for discharging product (p) from the bed plate (13). The bed plate (13) comprises at least one bed plate section, each of which is divided into elongated zones (32, 34–36) extending substantially between first and second positions of the plate section. First and/or second pluralities (22b, 22a) of the openings or perforations (22) are substantially uniformly distributed over the area of each of at least some (34–36) of said zones and are directed and shaped so as to impart to the fluidizing gas flows a flow component which is directed generally towards said first and second positions, respectively. The number of the second plurality of openings (22a) in one zone (35) exceeds that of the other (34, 36), whereby the resulting transporting component of the fluidizing gas flows may be adjusted as desired by choosing proper proportions of the number of the first and second pluralities of openings in adjacent zones.

21 Claims, 4 Drawing Sheets

METHOD AND APPARATUS FOR TREATING A PULVERULENT OR PARTICULATE MATERIAL OR PRODUCT WITH GAS

The present invention relates to a method and apparatus for treating a pulverulent or particulate material or product with gas so as to fluidize the material.

Fluid beds are used for drying and/or agglomerating particulate and powdered products, and they may be used as separate units, for example in connection with apparatus for spray drying milk products. The fluid bed unit may then be used for further drying and/or agglomerating a moist powdered or particulate material produced in a spray dryer. The bed plate of the fluid bed, which usually has a rectangular or another elongated shape, may be vibrated so as to contribute to the fluidization of the product being processed.

A fluid bed may also be combined with a spray dryer so as to form an integrated unit. A liquid product to be dried may then be sprayed into a flow of hot drying gas which is directed from the upper end of a cylindrical drying chamber towards a fluidized layer of already spray dried particles arranged at the bottom end of the drying chamber, cfr. U.S. Pat. No. 4,490,403. In a combined spray drying apparatus and fluid bed of this type the bed plate normally has a circular or an annular shape and is normally stationarily mounted.

The gas distributing openings or perforations in the bed plate of the fluidized bed may be shaped so as to define fluidizing flows of drying gas having a flow component which is directed along the upper surface of the bed plate towards a product outlet of the fluid bed, whereby deposits of product between the openings may be avoided. The flow component directed towards the product outlet also gives rise to a self-clearing or self-emptying effect. Bed plates having such gill type gas distributing openings are well known, vide for example U.S. Pat. Nos. 3,821,342 and 4,033,555.

Plug flow of the powdered or particulate product along the bed plate may be desirable. However, gas distributing openings of the gill type may cause the lower part of the fluidized product layer to be moved in the longitudinal direction of the elongated bed plate towards the product outlet at such a speed that the upper part of the fluidized layer tends to move in the opposite direction thereby creating an undesired backmixing of the fluidized product. When the bed plate has a circular or annular shape and is mounted at the bottom end of a combined spray dryer and fluidized bed as mentioned above, the gas distributing openings of the gill type are normally arranged so as to provide a circumferentially or tangentially directed flow component. This flow component causes a rotational movement of the fluidized product layer about the central axis of the bed plate, and it has been found that product particles or agglomerates, which have been formed by the spray drying process and which are present in the fluidized product layer, tend to disintegrate, when the rotational movement caused by the gill type openings in the bed plate becomes too pronounced. It is believed that the disintegration of the particles is caused by frictional forces acting between the particles, because the rotational speed of the particles in the fluidized layer decreases with increasing distance from the bed plate.

In order to reduce the above disadvantages of a bed plate with gas distributing openings of the gill type it has been proposed to provide the bed plate with mutually parallel corrugations extending transversely to the direction of movement of the product layer along the plate as described in U.S. Pat. No. 4,305,210. Another solution which is described in Danish patent No. 149,737 involves the use of a bed plate having transversely extending sections with oppositely directed gas distributing openings of the gill type, or transverse sections with circular, punched openings and openings of the gill type, respectively. These latter bed plate structures do to some extent reduce the product backmixing tendency in a fluid bed.

U.S. Pat. No. 4,885,848 discloses a fluid bed dryer comprising a bed plate with openings arranged in pairs of substantially oppositely directed openings, a depressed portion of the plate extending between the openings of each pair. Each depression may then be shaped so that the direction, the velocity, and/or the mass flow of the gas flows directed through the pair of openings defined at opposite sides of each depression are different so as to provide a resulting combined gas flow having a fluidizing flow component extending at right angles to the upper surface of the bed plate, and a transporting flow component extending along or parallel to the upper surface of the bed plate.

It has been found that a bed plate of the type disclosed in the above U.S. Pat. No. 4,885,848 is very sensitive to the flow conditions in the plenum chamber from which the fluidizing gas flows upwardly through the bed plate. This means that the flow pattern of the fluidizing gas flows is dependent not only on the pattern and shape of the openings in the bed plate and on the pressure in the plenum chamber, but also on the shape and volume of the plenum chamber and on the arrangement of the gas inlet or inlets to the plenum chamber.

The present invention provides a method by means of which it is possible to obtain a flow pattern of the fluidizing gas, which is less sensitive to the gas flow conditions in the plenum chamber and which also involves improvements in other respects as explained below.

Thus, the present invention provides a method of treating a pulverulent or particulate material with gas, said method comprising continuously feeding the material to a first position on a bed plate, directing streams or flows of gas upwardly through first and second pluralities of openings defined in the bed plate so as to fluidize the material thereon, the bed plate being divided into elongated zones each extending substantially between said first and second positions, and the openings of each of said first and second pluralities being substantially uniformly distributed over the area of one or more of said zones, and the number of openings of said second plurality of openings being different in adjacent zones, each of the gas flows directed through the openings of the second plurality having a flow component directed parallel with the plane of the bed plate and towards said second position thereon, moving the fluidized material along the bed plate in a general direction towards a second position thereon and discharging material from the bed plate at said second position, and the method according to the invention is characterized in directing the gas flows through the openings of said first plurality of openings so that each such gas flow has a flow component directed parallel with the plane of the bed plate and towards said first position thereon.

The bed plate openings of said first and/or second pluralities may be of the well-known gill-type, but may be of any other type which may define a gas flow with a flow component directed as described above. Thus, at least some of the openings may be of the type disclosed in U.S. Pat. No. 4,885,848. Because of the different number of said second plurality of openings in adjacent zones, the tendency of the fluidizing gas flows to move the material or product along the bed plate towards the second position or discharge end of the bed plate will be different in such adjacent zones. Consequently, it is possible to obtain a desired gas flow pattern, for example to improve the self-clearing or self-emptying effect of the bed plate by properly choosing the material transportation tendency or the material transportation factor along the various elongated zones of the bed plate.

The bed plate may be divided into a number of transverse, narrow areas with one or more rows of openings extending transversely to said general direction of moving the material or product along the bed plate, and the patterns of openings in these transverse areas may be identical. The bed plate may then be made by means of a punching tool for simultaneously punching the pattern of openings in one such narrow transverse area, and the consecutive transverse areas may then be punched by a series of consecutive punching operations.

The said second plurality of openings tending to move the material or product towards the second position or discharge position of the bed plate may constitute the majority of all openings in each of two or more adjacent elongated zones, and said first plurality of openings and/or plain openings defining gas flows without any substantial flow component parallel to the plane of the bed plate may constitute a minority or minorities of the openings in each zone or in at least one of the zones. In this manner it is possible to obtain different, but positive material transportation factors or tendencies for the various adjacent zones. Alternatively, the said second plurality of openings may be a majority of the openings in at least one zone, while said first plurality of openings may be a majority of the openings in an adjacent zone. In this case, a positive material transportation factor is obtained in said at least one zone, while a negative—and preferably smaller—material transportation factor is obtained in the adjacent zone, whereby the effect of the positive factor may be somewhat reduced by the negative factor. The said second plurality of openings may constitute all of the openings in said at least one zone, and the first plurality of openings may constitute all of the openings in said adjacent zone.

As indicated above, the negative material transportation factor obtained in the said adjacent zone is preferably smaller than the positive material transportation factor obtained in said one zone. This may be obtained when the width of said one zone exceeds that of said adjacent zone. Alternatively or additionally, the openings of said second plurality may be more closely spaced in said at least one zone than the openings of said first plurality in said adjacent zone.

The gas flows through the bed plate may additionally be directed substantially at right angles to the bed plate through a third plurality of said bed plate openings, the openings of the third plurality being substantially uniformly distributed over the area of at least one of the elongated zones.

As mentioned above, the bed plate may be substantially rectangular, and said general direction in which the product or material is transported along the bed plate may then be the longitudinal direction of the bed plate. When the bed plate is circular or annular the general direction may be the peripheral direction of the bed plate, the elongated zones being defined between mutually radially spaced, substantially concentric circles.

The present invention also provides a bed plate or bed plate section for a fluid bed defining first and second pluralities of openings therein for allowing fluidizing gas to flow upwardly through the plate or section, which is divided into elongated zones each extending substantially between first and second positions on the plate or plate section, and the openings of each of said first and second pluralities being substantially uniformly distributed over the area of one or more of said zones, and the number of openings of said second plurality of openings being different in adjacent zones, and each of the openings of the second plurality being directed and shaped so as to provide a fluidizing gas flow having a flow component directed parallel with the plane of the bed plate and towards said second position thereon, the bed plate or bed plate section being characterized in that each of the openings of said first plurality of openings is directed and shaped so as to provide a fluidizing gas flow having a flow component directed parallel with the plane of the bed plate and towards said first position thereon.

In principle, the bed plate may be made from any suitable material, and may, for example, be moulded from polymeric material. However, the bed plate is preferably made from sheet metal in which the openings are punched.

The flow components of the gas flows through said first and/or second plurality of openings parallel to the plane of the bed plate or plate section need not be directed exactly towards said first and second position, respectively. Thus, the openings may be arranged in groups each comprising at least one pair of openings, the openings of each group being shaped so as to provide gas flows forming a resulting gas flow having first and second flow components extending parallel to the plane of the bed plate (the transporting flow component) and at right angles to the plane of the bed plate (the fluidizing flow component), respectively, said first flow components of the various groups extending in substantially the same general direction. More specifically, the openings of said first and/or second pluralities are arranged in pairs in at least one of the zones, the openings in each pair being arranged so that the resulting flow components of such openings parallel to the plate or plate section define therebetween an angle which may be divided into a pair of acute angles by a line extending in the longitudinal direction of the respective zone. When the bed plate has an annular or circular shape, the transporting components preferably extend in the peripheral or tangential direction of the annular or circular bed plate, while the transporting components of the various groups of openings preferably extend in the longitudinal direction of the bed plate, when the bed plate has a rectangular or another elongated shape.

The present invention further provides a fluid bed dryer comprising at least one bed plate section defining first and second pluralities of openings therein and being divided into elongated zones each extending substantially, between first and second positions on the plate section, the opening of each of said first and second pluralities being substantially uniformly distributed over the area of one or more of said zones, and the number of openings said second plurality of openings being different in adjacent zones, means for feeding a pulverulent or particulate product to the bed plate, means for directing fluidizing gas flows upwardly through said openings so as to fluidize the product fed thereto, and means for discharging product from the bed plate, each of the openings of the second plurality of openings being directed and shaped so as to provide a fluidizing gas flow having a flow component directed parallel with the plane of the bed plate section and towards said second position thereon, the fluid bed dryer being characterized in that each of the openings of said first plurality of openings is directed and shaped so as to provide a fluidizing gas flow having a flow component directed parallel with the plane of the bed plate section and towards said first position thereon.

The fluid bed dryer may comprise a bed plate forming a single elongated plate section with opposite first and second ends, the feeding means being arranged at said first end defining said first position, and the discharge means being arranged at said second end defining said second position. Furthermore, the bed plate or bed plate sections may be formed as described above.

Figure 2:
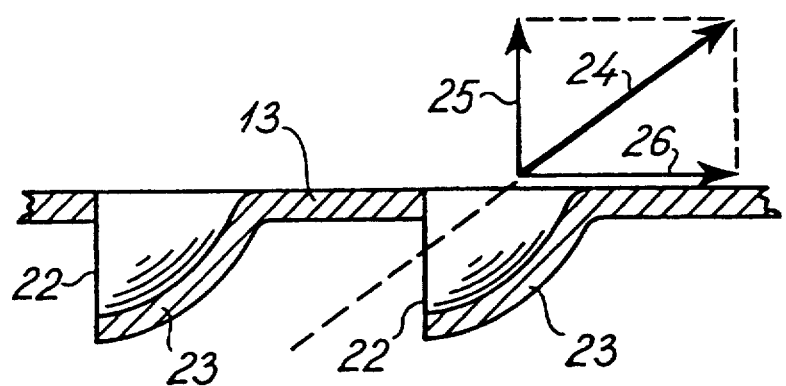
Figure 6:
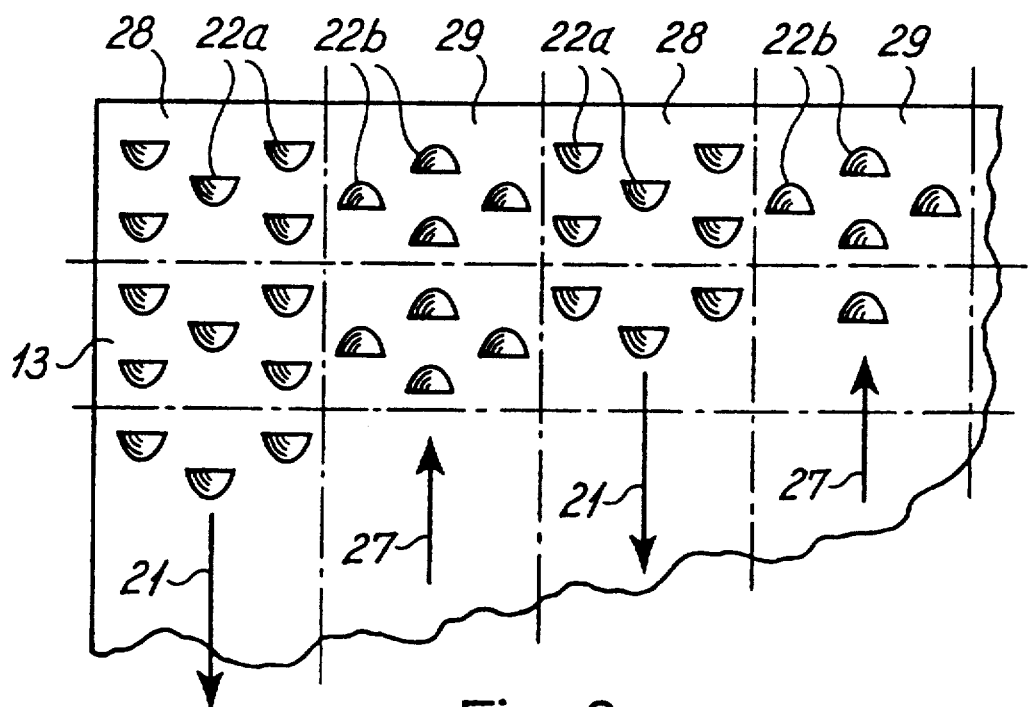
Figure 7:
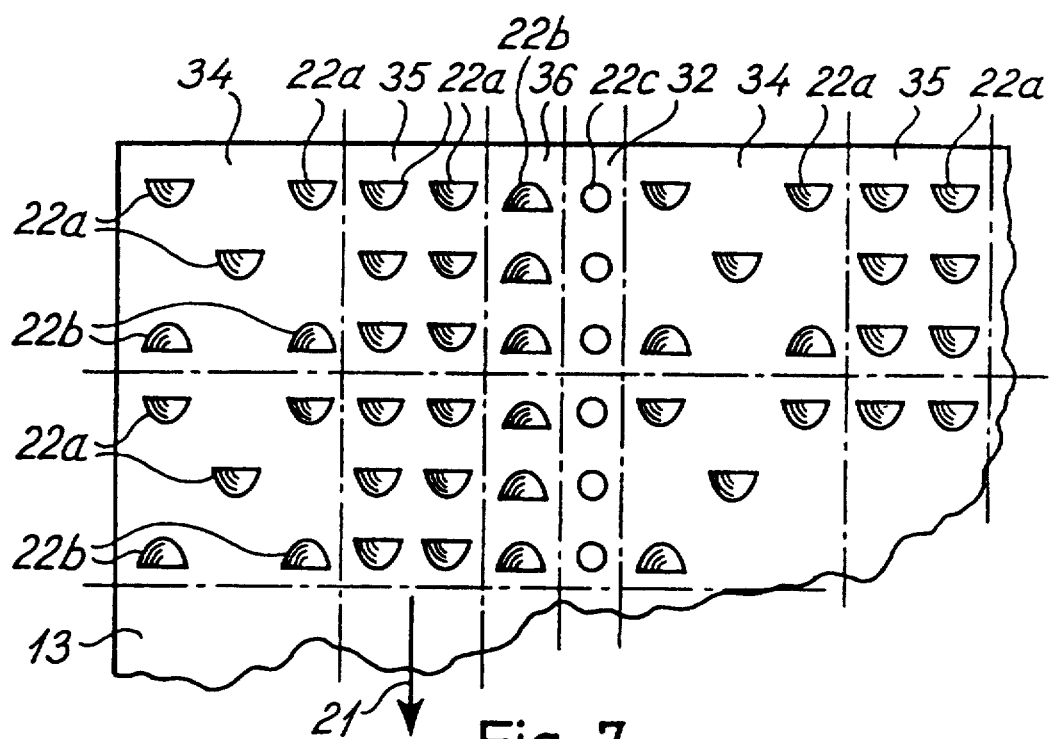
Figure 8:
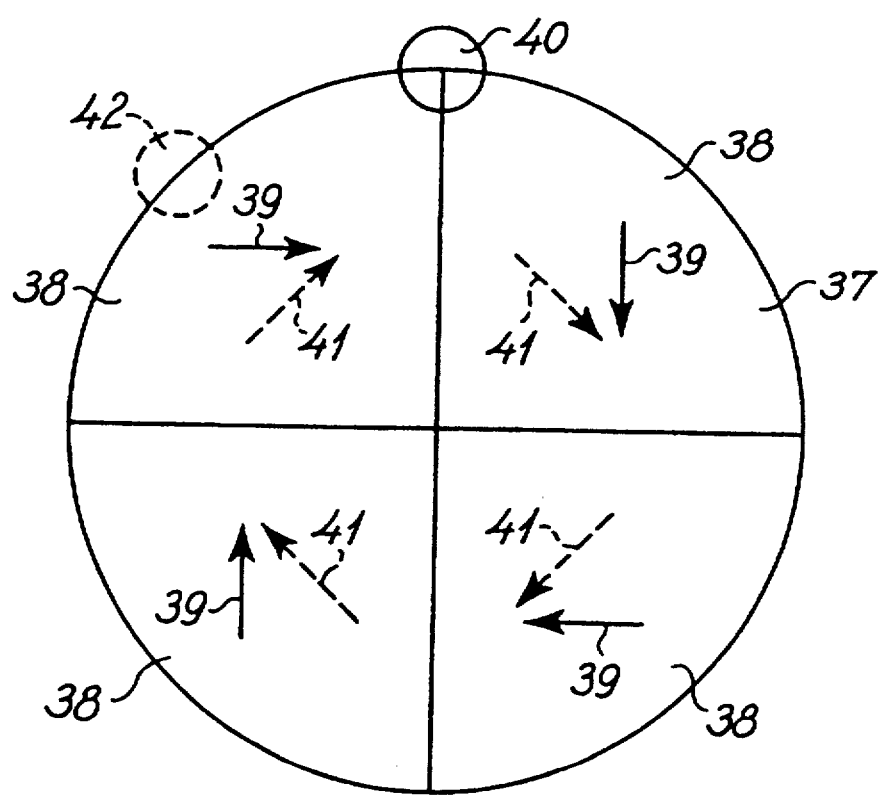

The invention will now be further described with reference to the drawings wherein FIG. 1 is a side view and partially sectional view of a drying apparatus with a fluid bed and comprising a bed plate according to the invention, FIG. 2 shows in an enlarged scale a fractional and sectional view of a bed plate with openings of the conventional gill type, FIGS. 3–7 are plan views showing fractions of various embodiments of substantially rectangular bed plates according to the invention, and FIG. 8 is a circular bed plate composed of bed plate sections according to the invention.

FIG. 1 shows a fluid bed dryer which may, for example, be used for drying a partially dried and still moist powdered or particulate product, such as a milk product, or another food product. The moist product to be dried in the fluid bed dryer may, for example, have been produced by a spray drying process. The fluid bed dryer shown in FIG. 1 comprises an elongated housing 10 having an inner space divided into upper and lower chambers 11 and 12, respectively, by means of a perforated bed plate 13, which is fastened to the inner walls of the housing 10. Heated drying gas or air is supplied to the lower chamber or plenum chamber 12 of the housing 10 through gas inlets 14, and drying gas is exhausted from the upper chamber 11 of the housing through a gas exhaust conduit 15, which may, for example, be connected to a cyclone, not shown, from which the drying gas may be exhausted into the atmosphere. At one end, the housing 10 comprises a product inlet funnel 16, which opens into the upper chamber 11 defined above the perforated bed plate 13. At the other end the housing 10 has a product outlet 17, which also communicates with the upper chamber 11.

A moist powdered or particulate product P, which may, for example, be supplied from a conventional spray drying system and which has to be further dried, may be fed continuously to the product inlet 16 of the housing 10 as indicated by an arrow 18. Heated drying gas or drying air is supplied to the lower chamber 12 of the housing, and the heated gas flows upwardly through the perforations of the bed plate and into the upper chamber 11 so as to form a plurality of gas flows fluidizing the product P on the bed plate 13. The thickness or the height of the fluidized product layer is determined by the height of a movable damper or valve member 19 forming an overflow at the outlet end of the chamber 11. When a state of equilibrium has been obtained an amount of dried product corresponding to the amount of moist product supplied through the inlet funnel 16 will flow out through the product outlet 17 as indicated by an arrow 20 in FIG. 1. Thus, when the fluid bed dryer is operating the fluidized product layer supported by the bed plate 13 is moved continuously from the inlet funnel 16 to the product outlet 17 as indicated by an arrow 21. When the operation of the fluid bed dryer has to be closed down, the supply of moist product to the inlet funnel 16 is stopped, and thereafter the damper or overflow plate 19 is moved to such a position that almost all of the product may flow from the bed plate 13 into the product outlet 17.

In order to ensure that no substantial residue of the product P remains on the bed plate when the damper 19 has been opened at least some of the perforations or gas distributing openings in the bed plate are formed so as to define upwardly directed fluidizing gas flows having a resulting horizontal flow component directed towards the product outlet 17.

FIG. 2 shows a conventional bed plate having perforations or openings 22 of the so-called gill type. Such an opening may be made in a plate of sheet metal by cutting an incision or slit through the plate and by depressing the adjacent parts 23 at one side of the incision or slit. Such a bed plate with perforations or openings 22 of the gill type defines upwardly directed, inclined gas flows having a direction indicated by an arrow 24 in FIG. 2. As indicated, the gas flow 24 has a fluidizing flow component 25 extending at substantially right angles to the plane of the bed plate 13 and a transporting flow component 26 extending substantially along the plane of the bed plate. When the transporting flow component 26 of the various perforations or openings of the gill type is directed towards the product outlet 17 any product residues are effectively removed from the bed plate 13, when the supply of product to the bed dryer has been stopped, and the damper 19 has been opened. Thus, a fluid bed dryer with a bed plate having perforations or openings of the gill type is self-cleaning or self-clearing. The depressed parts 23 of the bed plate 13 may be directed downwardly as shown in the drawings so as to obtain a relatively smooth upper surface of the bed plate. Alternatively, the depressed parts 23 may be directed upwardly, if desired.

It has been found, however, that in fluid bed dryers having a conventional bed plate with perforations or openings of the gill type, the efficiency of the transporting flow components 26 is too high so that the lower layers of the fluidized product P flow towards the product outlet 17, while the upper layers of the fluidized product flow in the opposite direction towards the product inlet 16. This causes an undesired backmixing of the fluidized product P, whereby the residence time of the various particles of the fluidized product P on the bed plate can vary substantially.

Figure 3:
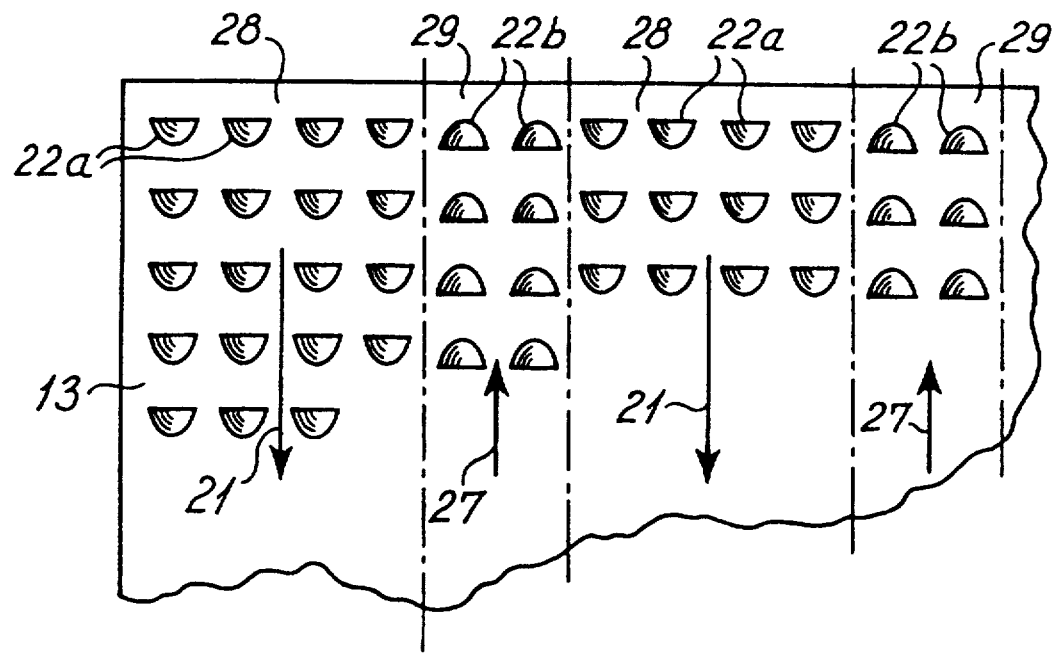

The openings 22 in the bed plate 13 shown in FIG. 3 are all of the gill type. The plate comprises openings 22a directed towards the discharge end of the plate, which-direction is indicated by arrows 21 in FIGS. 1 and 3. The plate further comprises openings 22b directed against the inlet end of the plate, which direction is indicated by arrows 27 in FIG. 3. The pattern of openings in the plate 13 is such that transversely spaced longitudinal zones 28 of the plate each contain a number (for example four) of longitudinally extending rows of openings 22a, which are all directed towards the outlet end of the plate, while adjacent intermediate zones 29 each comprises a smaller number (for example two) of rows of the openings 22b, which are all directed towards the inlet end of the bed plate 13 in the direction indicated by the arrows 27. In FIGS. 3–7 the division of the bed plate 13 into longitudinally extending zones is indicated by dot-and dash lines.

As explained in connection with FIG. 2, the fluidizing gas flowing upwardly through each of the perforations or openings 22a in the zones 28 gives rise to a product transporting flow component directed as indicated by the arrows 21. Similarly, the fluidizing gas flowing upwardly through each of the openings 22b in the zones 29 gives rise to an oppositely directed flow component as indicated by the arrows 27. Because the number of openings 22b in each of the zones 29 is substantially smaller than the number of openings 22a in each of the adjacent zones 28 the effect of the product transporting components of the gas flows through the openings 22a in the zones 28 will be somewhat reduced by the product transporting flow components of the gas flowing through the openings 22b in the zones 29.

If desired, the product transporting effect could be further reduced by increasing the number of openings 22b in the zones 29, or be increased by reducing the number of openings in the zones 29. As an example, the number of rows of openings in each of the zones 29 could be increased to three or reduced to one.

Figure 4:
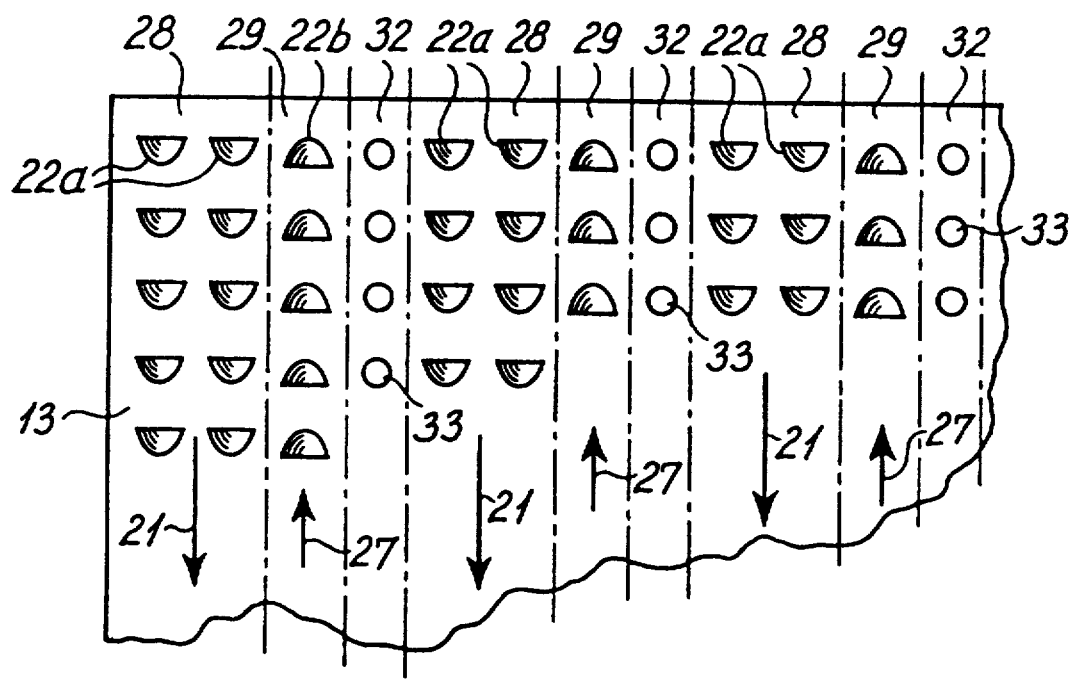

The bed plate shown in FIG. 4 comprises transversely spaced, longitudinally extending zones 28 in which all of the openings are of the gill type directed towards the outlet end of the bed plate as indicated by the arrows 21, and adjacent, intermediate zones 29 and 32, respectively, which include gill type openings 22b and plain punched circular openings 33, respectively.

The number of gill type openings 22a in each of the zones 28 substantially exceeds the number of gill type openings 22b in each of the zones 29. In FIG. 4, each zone 28 includes a number of openings 22a which is double the number of openings 22b in each of the zones 29. However, this relationship between the number of openings in the various zones could be changed, if desired. While the fluidizing gas flowing upwardly through the gill type openings 22b in each of the zones 29 will reduce the product transporting effect of the gas flows through the openings 22a in the zones 28, the plain, circular openings 33 in the zones 32 will not influence the product transporting effect of the fluidizing gas flows.

Figure 5:
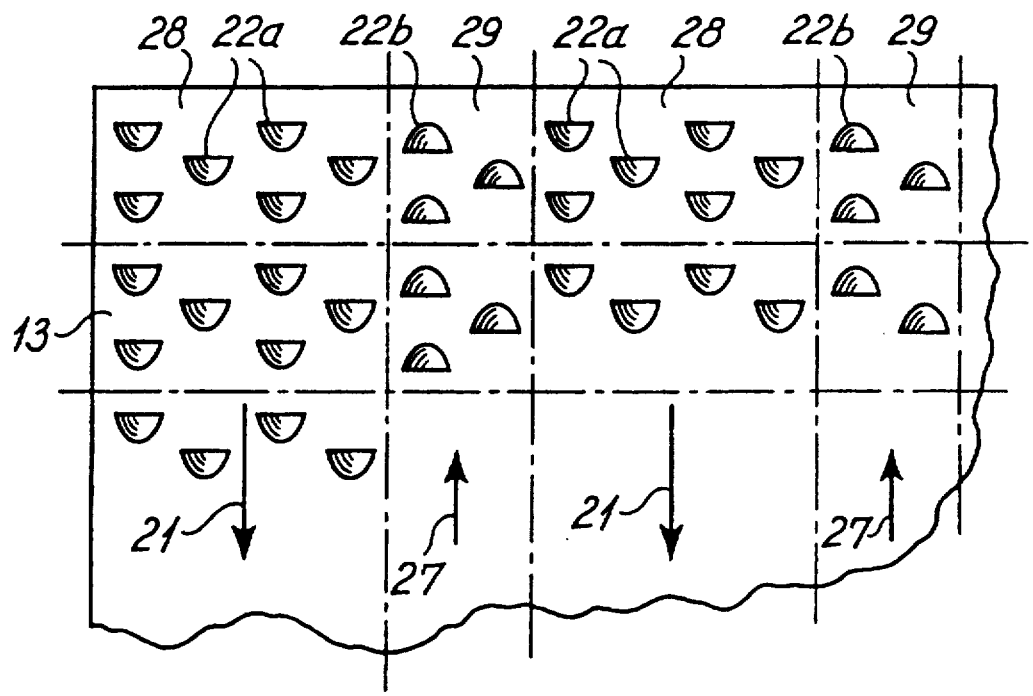

The bed plate 13 shown in FIG. 5 may be divided into a number of transversely spaced, longitudinally extending zones 28 exclusively including gill type openings 22a directed towards the discharge end of the bed plate as indicated by the arrows 21. The adjacent, intermediate zones 29 exclusively include gill type openings 22b directed oppositely as indicated by the arrows 27. In each of the zones 28 and 29 the openings 22a and 22b in adjacent longitudinal rows are longitudinally offset. In the embodiment shown in FIG. 5, the number of openings 22a in each of the zones 28 is twice the number of openings 22b in each of the zones 29. This interrelationship between the numbers of openings in adjacent zones could, of course, be changed, if desired. As indicated by transversely extending dot-and-dash lines in FIG. 5, the bed plate 13 may be divided into a number of transverse zones or areas having identical patterns of openings. This means, that the openings in the bed plate may be made by means of a punching tool which may punch all of the openings in one transverse zone or area at a time. Consequently, the openings in the bed plate 13 may be punched by a number of consecutive punching operations corresponding to the number of transverse zones of the bed plate.

The bed plate 13 shown in FIG. 6 corresponds to that shown in FIG. 5. However, the relationship between the number of openings 22a in each of the zones 28 and the number of openings 22b in each of the zones 29 is now 5:4, which means that the resulting product transporting component of all of the fluidizing gas flows in the direction indicated by the arrows 21 will be relatively small.

The bed plate 13 shown in FIG. 7 may be divided into longitudinal zones 32, 34, 35, and 36 having mutually different patterns of the openings 22. The openings 22 in each of the longitudinal zones 34 are arranged in three longitudinal rows and the openings in each of the rows are longitudinally offset in relation to the openings in an adjacent row. The central longitudinal row of openings 22a are all directed towards the discharge end of the bed plate, while the openings 22a and 22b in each of the other rows are arranged in oppositely directed pairs of openings, so that only the openings 22a in the central row provides a product transporting component directed towards the discharge end of the plate.

The longitudinal zone 35 includes two longitudinal rows of openings 22a, which are all directed towards the discharge end of the plate as indicated by the arrow 21.

The longitudinal zone 36 comprises one row of openings 22b directed oppositely to the direction indicated by the arrow 21 and, finally, the longitudinal zone 32 includes one row of plain circular openings 22c.

As indicated by transversely extending dot-and-dash lines also the bed plate 13 in FIG. 7 may be divided into a number of transverse zones or areas having identical patterns of openings 22 so that the opening patterns in the transverse zones may be punched one at a time in consecutive punching operations by means of the same punching tool.

It should be understood that the opening patterns in the various longitudinal zones 32, and 34–36 of the bed plate 13 shown in FIG. 7 could be changed and that each longitudinal zone may comprise two or more different kinds of openings, such as the openings 22a, 22b, and/or 22c. However, the number of gill type openings 22a directed towards the outlet end of the bed plate 13 in one longitudinal zone is preferably different from that of an adjacent longitudinal zone so that the transverse "product transportation profile" may be varied transversely across the bed plate in order to obtain desired flow conditions of the fluidizing gas flowing upwardly through the various openings 22 in the bed plate 13, for example in order to compensate for frictional forces along the side walls of the bed.

FIG. 8 diagrammatically shows a circular bed plate 37, which may, for example, be used in a combined spray dryer and fluid bed dryer, a so-called integrated fluid bed spray dryer. The bed plate 37 is made from four bed plate sections 38 each shaped as a right angled sector of a circle. The bed plate sections 38 are provided with openings or perforations for fluidizing gas arranged in patterns for example as shown in any of FIGS. 3–7. The patterns of openings in the bed plate sections 38 may be the same or they may be different. However, the upwardly directed fluidizing gas flows through the openings of each plate section 38 provide a resulting product transporting component in directions indicated by arrows 39.

It is understood that particulate or pulverulent product supplied to the bed plate 37 will be moved in the directions indicated by the arrows 39 so that the product will circulate along the bed plate 37. Dried or otherwise treated product may be discharged through a discharge duct 40. Alternatively, the openings of the bed plate sections 38 may provide resulting product transporting components indicated by arrows 41 in broken lines, and treated material may then be discharged through a discharge duct 42 which is also shown in broken lines.

EXAMPLE 1

In a bed plate having a pattern of gill type openings as shown in FIG. 3 the distance between the longitudinal rows of openings is 16 mm. The transversely extending rows of openings are divided into pairs which have been punched in the same punching operation. The distance between the transverse rows of each pair is 10 mm, and the distance between adjacent transverse rows of adjacent pairs is 11 mm. Thus, the number of openings is 5,952 per m$^2$ of the bed plate.

Various bed plates with identical opening patterns, but with different opening sizes are produced. A pressure difference of 100 mm water column at 20° C. (980 Pascal) is established across the bed plate, and the following fluidizing gas flow velocities are obtained for the various bed plates: 0.30 m/sec, 0.35 m/sec, 0.40 m/sec, 0.50 m/sec, 0.60 m/sec, 0.70 m/sec, 0.80 m/sec, 0.90 m/sec and 1.10 m/sec. Thus, a wide range of gas flow velocities is available for treatment of materials with different fluidization properties

EXAMPLE 2

A bed plate is produced with the same opening pattern as in Example 1. However, the mutual distance between adjacent transverse rows of openings of adjacent pairs of transverse openings is increased to 25 mm, so that the number of openings is reduced to 4,167 per m$^2$ of the bed plate. The size of each opening is approximately the same as for the bed plate in Example 1, where a fluidizing gas velocity of 0.30 m/sec is obtained. When the pressure difference across the bed plate is 100 mm water column at 20° C. (980 Pascal) the fluidizing gas velocity is 0.20 m/sec.

EXAMPLE 3

In a bed plate having a opening pattern as shown in FIG. 5, the distance between adjacent longitudinal rows of openings is 8 mm, the distance between adjacent transverse rows of openings in each transverse section is 5 mm, and the distance between adjacent transverse rows of adjacent transverse sections is 11 mm. Thus, each m$^2$ of the bed plate contains 8,928 openings of the gill type. Bed plates of that type are produced so as to obtain fluidizing gas velocities within the range 0.45–1.65 m/sec, when a pressure difference of 100 mm water column at 20° C. (980 Pascal) is established across the bed plate.

It should be understood that various modifications and changes of the bed plates described above with reference to the drawing could be made within the scope of the appended claims. Thus, the opening pattern of a bed plate according to the invention could comprise other combinations of the longitudinal zones described above or shown in the drawings. The value of the resulting product transporting component of the fluidizing gas flows varies from zone to zone, and the transporting component in one zone may define an angle with that of an adjacent zone.

I claim:

1. A method of treating a particulate material or product with gas, said method comprising
   continuously feeding the material to a first position on a bed plate,
   directing flows of gas upwardly through first and second pluralities of openings in the bed plate so as to fluidize the material thereon, the bed plate being divided laterally into elongated zones each zone extending substantially between said first position and a second position, the openings of each of said first and second pluralities being substantially uniformly distributed over the area of at least one of said zones, and the number of openings of said second plurality being different in adjacent zones, the gas flows through the openings of said first plurality of openings being directed so that each such gas flow has a flow component directed parallel with the plane of the bed plate and towards said first position thereon, while each of the gas flows directed through the openings of the second plurality has a flow component directed parallel with the plane of the bed plate and towards said second position thereon, and
   moving the fluidized material along the bed plate in a general direction towards the second position thereon and discharging material from the bed plate at said second position 2. A method according to claim 1, wherein the number of openings of the second plurality of openings is the majority of the openings in at least one zone while the number of openings of the first plurality of openings is the majority of the openings in an adjacent zone.

3. A method according to claim 2, wherein the width of said at least one zone exceeds that of said adjacent zone.

4. A method according to claim 2, wherein the openings of said second plurality are more closely spaced in said at least one zone than the openings of said first plurality in said adjacent zone.

5. A method according to claim 1, wherein further gas flows are directed substantially at right angles to the bed plate.

6. A method according to claim 1, wherein the openings of said first and second pluralities in at least one of said zones are of the gill-type.

7. A method according to claim 1, wherein the bed plate is substantially rectangular, said general direction being the longitudinal direction of the bed plate.

8. A method according to claim 1, wherein the bed plate is annular, the elongated zones being defined between mutually radially spaced, substantially concentric circles and said general direction being the peripheral direction of the bed plate.

9. A bed plate for a fluid bed having a first, inlet position and a second, outlet position, and defining first and second pluralities of openings therein for allowing fluidizing gas to flow upwardly through the plate, which is divided laterally into a plurality of elongated zones each of said zones extending substantially between said first and second positions, and the openings of each of said first and second pluralities being substantially uniformly distributed over the area of at least one of said zones, the number of openings of said second plurality being different in adjacent zones, and each of the openings of said first plurality being directed and shaped so as to define means to provide a fluidizing gas flow having a flow component directed parallel with the plane of the bed plate and towards said first position thereon, while each of the openings of the second plurality is directed and shaped so as to define means to provide a fluidizing gas flow having a flow component directed parallel with the plane of the bed plate and towards said second position thereon.

10. A bed plate according to claim 9, wherein the number of openings of said second plurality of openings is the majority of the openings in at least one zone, while the number of openings of said first plurality of openings is the majority of the openings in an adjacent zone.

11. A bed plate according to claim 10, wherein the width of said at least one zone exceeds that of said adjacent zone.

12. A bed plate according to claim 10, wherein the openings of said second plurality are more closely spaced in said at least one zone than the openings of said first plurality in said adjacent zone.

13. A bed plate according to claim 9, further comprising a third plurality of openings which are substantially uniformly distributed over the area of at least one of said zones, and which are shaped so as to direct fluidizing gas flowing therethrough substantially at right angles to the plate or section.

14. A bed plate or bed plate section according to claim 13, wherein all of the openings in at least one of the zones are of said third plurality.

15. A bed plate according to claim 9, wherein the openings of said first and second pluralities are arranged in pairs the openings in each pair being arranged so that the resulting flow components of such openings parallel to the plate define therebetween an angle which may be divided into a pair of adjacent acute angles by a line extending in the longitudinal direction of the respective zone.

16. A bed plate according to claim 15, wherein said adjacent acute angles are of substantially the same size.

17. A bed plate according to claim 9, wherein the openings of said first and second pluralities of openings are of the gill-type.

18. A bed plate according to claim 9, wherein the bed plate is substantially rectangular, and said zones extend in a longitudinal direction of the bed plate.

19. A bed plate according to claim 9, wherein the bed plate is substantially annular and the elongated zones are defined between mutually radially spaced, substantially concentric circles, said zones extending in the peripheral direction of the bed plate.

20. A fluid bed dryer comprising:
a bed plate comprising at least one bed plate section having a first, inlet position and a second outlet position, and defining first and second pluralities of openings therein and being divided laterally into a plurality of elongated zones, each of said zones extending substantially between said first and second positions, the openings of each of said first and second pluralities being substantially uniformly distributed over the area of at least one of said zones, and the number of openings of said second plurality being different in adjacent zones,
means for feeding a particulate product to the bed plate above and adjacent said first position,
means for directing fluidizing gas flows upwardly through said openings so as to fluidize the particulate product fed thereto, and
means for discharging product from the bed plate adjacent said second position,
each of the openings of said first plurality being directed and shaped so as to define means to provide a fluidizing gas flow having a flow component directed parallel with the plane of the bed plate section and towards said first position thereon, while each of the openings of the second plurality is directed and shaped so as to define means to provide a fluidizing gas flow having a flow component directed parallel with the plane of the bed plate section and towards said second position thereon.

21. A fluid bed dryer according to claim 20, wherein the bed plate is a single elongated plate section with opposite first and second ends, the feeding means being arranged at said first end defining said first position, and the discharge means being arranged at said second end defining said second position.

* * * * *

UNITED STATES PATENT AND TRADEMARK OFFICE
CERTIFICATE OF CORRECTION

PATENT NO. : 5,357,688
DATED : October 25, 1994
INVENTOR(S) : Mogens A. Christensen It is certified that error appears in the above-identified patent and that said Letters Patent is hereby corrected as shown below:

Title page:

[73] Assignee: change "Niro A/S" to

--Niro Holding A/S--.

Signed and Sealed this

Sixteenth Day of May, 1995

*Attest:*

BRUCE LEHMAN

*Attesting Officer*     *Commissioner of Patents and Trademarks*